(12) United States Patent
Chafekar (10) Patent No.: US 11,296,631 B2
(45) Date of Patent: Apr. 5, 2022

(54) DYNAMIC HYBRID VEHICLE SYSTEM FOR ADJUSTING THE ROTARY POSITION INDEPENDENT OF MOTOR MOUNT

(71) Applicant: XL Hybrids, Boston, MA (US)

(72) Inventor: Tejas Chafekar, Newton, MA (US)

(73) Assignee: XL Hybrids, Boston, MA (US)

( * ) Notice: Subject to any disclaimer, the term of this patent is extended or adjusted under 35 U.S.C. 154(b) by 45 days.

(21) Appl. No.: 16/682,469

(22) Filed: Nov. 13, 2019

(65) Prior Publication Data

US 2021/0143763 A1    May 13, 2021

(51) Int. Cl.
*H02P 21/09* (2016.01)
*H02P 21/14* (2016.01)
*H02K 15/03* (2006.01)
*H02K 15/04* (2006.01)
*H02K 7/00* (2006.01)

(52) U.S. Cl.
CPC .......... *H02P 21/09* (2016.02); *H02K 15/03* (2013.01); *H02K 15/045* (2013.01); *H02P 21/14* (2013.01); *H02K 7/006* (2013.01)

(58) Field of Classification Search
CPC ...... H02K 15/03; H02K 15/045; H02P 21/14; H02P 21/09; H02P 21/18
See application file for complete search history.

(56) References Cited

U.S. PATENT DOCUMENTS

| | | | | |
|---|---|---|---|---|
| 4,530,056 A * | 7/1985 | MacKinnon | .......... | G05D 1/0238 180/168 |
| 5,383,127 A * | 1/1995 | Shibata | ................. | G01C 21/30 340/988 |
| 5,479,079 A * | 12/1995 | Jeong | .................... | G01C 25/00 318/568.12 |
| 6,329,781 B1 * | 12/2001 | Matsui | ................. | B60L 15/025 318/717 |
| 7,468,594 B2 * | 12/2008 | Svensson | ............... | B25J 9/1674 318/560 |
| 8,013,556 B2 * | 9/2011 | Hattori | .................... | H02P 21/05 318/433 |
| 8,447,518 B2 * | 5/2013 | Tanino | ................. | G01C 21/165 701/472 |
| 9,273,968 B2 * | 3/2016 | Oohashi | ............... | G01C 21/165 |
| 9,374,031 B2 * | 6/2016 | Suzuki | .................... | H02P 21/14 |
| 10,118,607 B1 | 11/2018 | Lovelace et al. | | |
| 10,773,713 B2 | 9/2020 | Lovelace et al. | | |
| 2011/0043144 A1 * | 2/2011 | Ueda | .................... | B62D 5/046 318/400.02 |
| 2014/0225540 A1 | 8/2014 | Omata et al. | | |
| 2019/0308608 A1 | 10/2019 | Lovelace et al. | | |
| 2021/0039629 A1 | 2/2021 | Lovelace et al. | | |

* cited by examiner

*Primary Examiner* — Thai T Dinh (74) *Attorney, Agent, or Firm* — Fish & Richardson P.C.

(57) ABSTRACT

Systems, computer readable media storing instructions, and computing device-implemented methods include receiving one or more signals that represent an angular speed of a permanent magnet electric motor of a hybrid electric vehicle, receiving a signal representing a voltage from the electric motor, determining if the angular speed is within a predetermined threshold, calculating an error angle representing a correction factor for an alignment of the electric motor based on a ratio of the voltage and the angular speed, determining if the error angle indicates that the motor is installed in a correct or an incorrect orientation, and adding an orientation correction factor to the error angle.

21 Claims, 6 Drawing Sheets

DYNAMIC HYBRID VEHICLE SYSTEM FOR ADJUSTING THE ROTARY POSITION INDEPENDENT OF MOTOR MOUNT

BACKGROUND

This description relates to techniques for controlling position error calculation of a motor shaft rotating without any current command to the motor.

With the increased interest in reducing dependency on fossil fuels, the use of alternative energy sources has been incorporated into various applications such as transportation. Both public and private transportation vehicles have been developed to run on a fuel other than traditional petroleum based fuels (i.e., petrol, diesel, etc.). Some vehicles solely use alternative energy sources while others combine the functionality of petroleum based systems with alternative energy based systems (e.g., electrical, biofuel, natural gas, etc.). Along with being potentially more cost-effective and having more abundant resources, such alternative energy sources and their byproducts are considered to be more environmentally friendly.

SUMMARY

When manufacturing a permanent magnet variable speed electric motor, proper motor control requires precise knowledge of the specific position of the motor rotor magnetic poles as it spins relative to the stator phase windings with rotation driven by an attached inverter. Conventional control techniques use a rotating position sensor on the rotor shaft to provide this information. However, any circumferential shift of the position sensor from the specified manufacture position will result in errors in system control and therefore performance degradation of the vehicle using that motor. A circumferential shift of the position of the sensor can occur when the motor rotor itself is installed with an incorrect orientation. This can happen if the motor is installed backwards (in reverse orientation), or if an error is made in mapping the voltage connections with the system's inverter during installation.

To compensate for any inconsistency in motor placement, some users perform a physical measurement or check of each motor assembled manually. An incorrectly installed motor may be removed and then re-installed. However, this procedure is expensive and time-consuming. To compensate for any incorrect motor installation configuration, the controller detects if the motor angle is not close to zero degrees. Advantageously, such a check allows configuration control over differing software versions, vehicle platforms, and motors.

The systems and techniques described here relate to performing measurements to compensate for any offset of the intended position of a position sensor (or matched pair of position sensors called a resolver) of an installed inverter-motor system. This methodology can be implemented after connecting the inverter to the motor. The methodology determines a calibration factor that is used from then on (until the system is modified) when the motor is spun and stores the calculated offset in memory in the inverter. This capability is primarily applicable to hybrid vehicle applications where the motor does not have to provide electric launch capability. These systems and techniques are related to those for accounting for motor sensor position as described by U.S. Pat. No. 10,118,607, whose contents are incorporated herein in their entirety.

Various implementations described herein include computing device implemented methods. The methods include receiving one or more signals that represent an angular speed of a permanent magnet electric motor of a hybrid electric vehicle. The one or more signals are provided by an angular sensor connected to the electric motor. The methods include receiving a signal representing a voltage from the electric motor. The voltage is a direct axis voltage component of a three-phase motor model. The methods include determining if the angular speed is within a predetermined threshold. The methods include calculating an error angle representing a correction factor for an alignment of the electric motor based on a ratio of the voltage and the angular speed. The methods include determining if the error angle indicates that the motor is installed in a correct or an incorrect orientation. The methods include adding an orientation correction factor to the error angle.

In certain implementations, determining if the error angle indicates that the motor is installed in a correct orientation includes determining if the error angle is within a predefined range. The predefined range is ±15°, in particular implementations.

In some implementations, the orientation correction factor is ±120°.

In certain implementations, the signals are received with zero current supplied to the electric motor and a motion of the vehicle is supplied by an internal combustion engine.

In particular implementations, the correction angle is calculated using an averaged ratio of the voltage and the angular speed over more than one rotation of the electric motor.

In some implementation, receiving the one or more signals that represent the angular speed of the motor is implemented by receiving a trigger signal sent to a performance manager of the vehicle when a performance parameter of the vehicle is determined to be outside of acceptable operation.

Various implementations provide one or more computer readable storage devices storing instructions that are executable by a processing device, and upon such execution cause the processing device to perform operations that include receiving one or more signals that represent an angular speed of a permanent magnet electric motor of a hybrid electric vehicle. The one or more signals are provided by an angular sensor connected to the electric motor. The operations also include receiving a signal representing a voltage from the electric motor. The voltage is a direct axis voltage component of a three-phase motor model. The operations also include determining if the angular speed is within a predetermined threshold, calculating an error angle representing a correction factor for an alignment of the electric motor based on a ratio of the voltage and the angular speed, determining if the error angle indicates that the motor is installed in a correct or an incorrect orientation, and adding an orientation correction factor to the error angle.

In certain implementations, determining if the error angle indicates that the motor is installed in a correct orientation comprises determining if the error angle is within a predefined range. The predefined range is ±15°, in particular implementations.

In some implementations, the orientation correction factor is ±120°.

In certain implementations, the signals are received with zero current supplied to the electric motor and a motion of the vehicle is supplied by an internal combustion engine.

In particular implementations, the correction angle is calculated using an averaged ratio of the voltage and the angular speed over more than one rotation of the electric motor.

In some implementations, receiving the one or more signals that represent the angular speed of the motor is implemented by receiving a trigger signal sent to a performance manager of the vehicle when a performance parameter of the vehicle is determined to be outside of acceptable operation.

Various implementations provide systems that include a computing device including a memory configured to store instructions and a processor to execute the instructions to perform instructions that include receiving one or more signals that represent an angular speed of a permanent magnet electric motor of a hybrid electric vehicle. The one or more signals are provided by an angular sensor connected to the electric motor. The instructions include receiving a signal representing a voltage from the electric motor, the voltage being a direct axis voltage component of a three-phase motor model. The instructions include determining if the angular speed is within a predetermined threshold. The instructions include calculating an error angle representing a correction factor for an alignment of the electric motor based on a ratio of the voltage and the angular speed. The instructions include determining if the error angle indicates that the motor is installed in a correct or an incorrect orientation. The instructions include adding an orientation correction factor to the error angle.

In certain implementations, determining if the error angle indicates that the motor is installed in a correct orientation comprises determining if the error angle is within a predefined range. The predefined range is ±15°, in particular implementations.

In some implementations, the orientation correction factor is ±120°, the signals are received with zero current supplied to the electric motor and a motion of the vehicle is supplied by an internal combustion engine.

In particular implementations, the correction angle is calculated using an averaged ratio of the voltage and the angular speed over more than one rotation of the electric motor.

In some implementations, the one or more signals that represent the angular speed of the motor is implemented by receiving a trigger signal sent to a performance manager of the vehicle when a performance parameter of the vehicle is determined to be outside of acceptable operation.

These and other aspects and features and various combinations of them may be expressed as methods, apparatus, systems, means for performing functions, program products, and in other ways.

Other features and advantages will be apparent from the description and the claims.

DETAILED DESCRIPTION

The systems and techniques described here relate to performing measurements to detect an offset due to improper motor orientation, and compensate for the offset from the ideal position of a position sensor of an installed inverter-motor system. This technique can be implemented after connecting the inverter to the motor. The technique determines a calibration factor that is used from then on (until the system is modified) when the motor is spun and stores the calculated offset in memory in the inverter. This capability is primarily applicable to hybrid vehicle applications where the motor does not have to provide electric launch capability. This calibration can also be performed in a purely electric system once the motor is at speed by letting it coast down.

Figure 1:
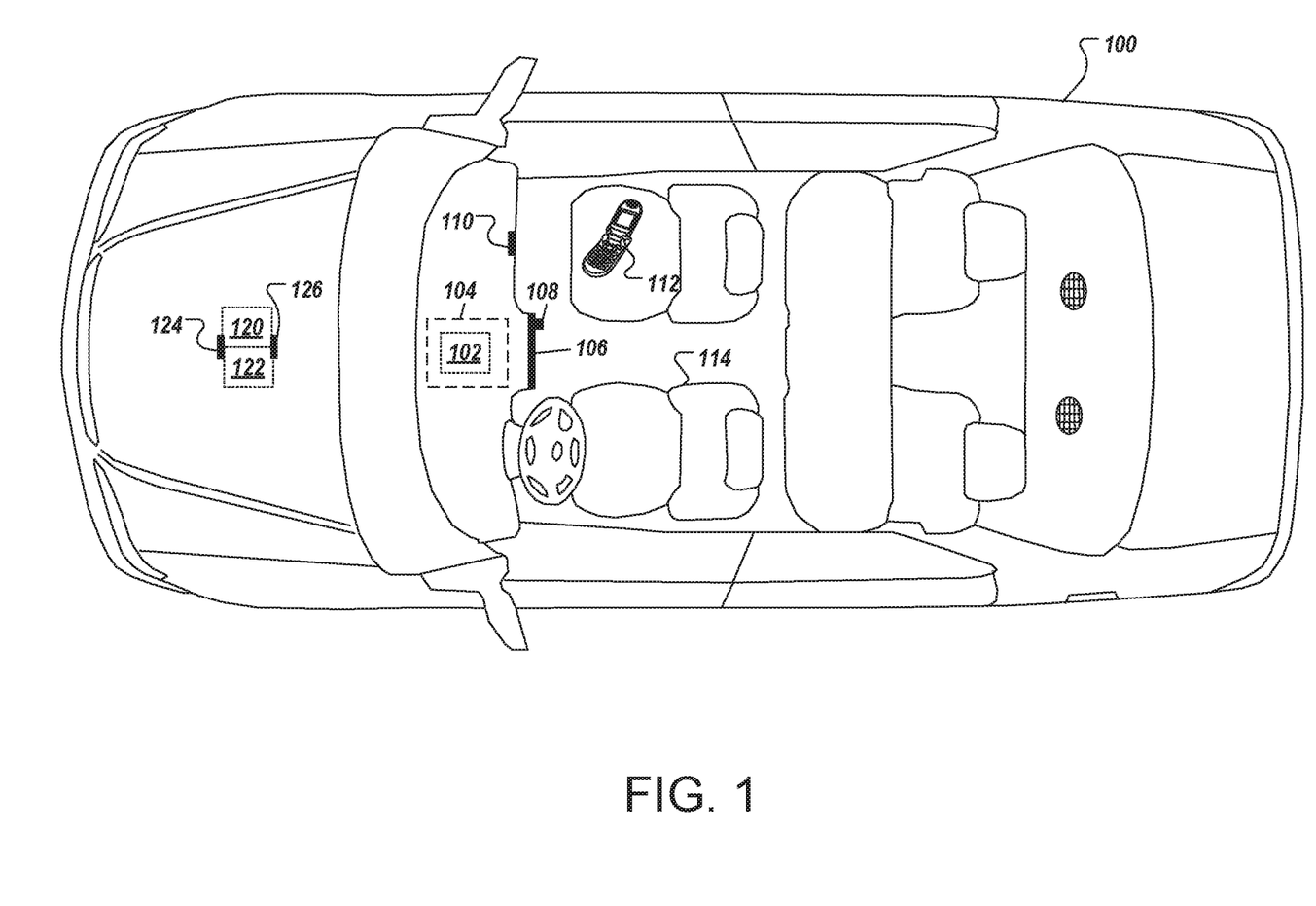
FIG. 1 illustrates a vehicle that includes a vehicle information manager.

Referring to FIG. 1, alternative fuel vehicles may solely rely upon non-petroleum energy sources, such as electricity, natural gas, biofuels etc. Rather than sole reliance on such energy sources, alternative fuel vehicles may also rely partially on an internal combustion engine along with one or more alternative energy sources. For example, a vehicle (referred to as a hybrid vehicle) may use two or more distinct power sources, such as an electric motor, an internal combustion engine, and an energy storage device (referred to as a hybrid electric vehicle (HEV) using rechargeable batteries). Some hybrid vehicles (referred to as plug-in hybrid electric vehicles (PHEV)) may operate by using energy storage devices that can be replenished by off-board energy sources. For electrical energy storage devices, in some arrangements, one or more techniques may be implemented for charging and recharging the devices. For example, batteries may be charged through regenerative braking, strategic charging techniques, etc. during appropriate operating periods of the vehicle. In general, while energy is typically lost as heat in conventional braking systems, a regenerative braking system may recover this energy by using an electric generator to assist braking operations. Some systems and techniques may also strategically collect (e.g., drain energy from the combustion engine during periods of efficient operation (e.g., coasting, traveling, etc.)) and later assist the engine during periods of lesser efficiency. For such vehicles, the electric generator can be a device separate from the electric motor, considered as a second operating mode of the electric motor, or implemented through one or more other techniques, individually or in combination. Energy recovered by regenerative braking may be considered insufficient to provide the power needed by the vehicle. To counteract this lack of energy, the electric motor may be engaged during defined periods to assist the combustion engine. One or more control strategies may be used to determine these time periods. Similarly, periods of time may also be determined to engage regenerative braking and strategic charging in order to replenish energy storage. Other operations of the vehicle (e.g., accelerate, decelerate, gear changes, etc.) may also be defined for the control strategies. By developing such strategies to control the assistance provided to combustion engines (during low efficiency periods), energy may be conserved without negatively impacting vehicle performance.

In vehicles that are converted to a HEV, vehicle performance is increased if any rotor position offset in the installed electric motor is known by its associated inverter. To produce the same amount of torque with a non-zero offset error, additional current is required which results in additional losses and energy used. For a permanent magnet (PM) motor, torque is proportional to the product of current and the cosine of offset error, so the torque assistance lost is proportional to the cosine of the offset error. The percent of additional losses is the cosine of the inverse of the offset error squared. In a motor with ten pole pairs, 1 mechanical degree error results in is 3% increase in losses, and 2 mechanical degree error leads to a 13% increase in losses. Losses in the inverter and energy storage also increase in addition to losses in the electric motor.

Some vehicle manufacturers may recommend operations and control strategies for entire classes of vehicles or other types of large vehicle groups (e.g., same model vehicles, same vehicle line, etc.) at particular times (e.g., at the release of the vehicle line). Similarly, the level of assistance provided by an electric motor or other type of alternative fuel system may be a constant. One or more techniques may be implemented to improve recommended operations and control strategies. For example, vehicle performance may be measured to quantify improvements. Fuel efficiency (e.g., miles-per-gallon achieved by the vehicle), fuel consumption (e.g., fuel gallons consumed per hour), and other types of performance measures may be developed and report noticeable to considerable improvement. Once analyzed, the improvements may be incorporated into recommended operations and control strategies. For example, the retrieved data might report that energy provided by the alternative fuel during higher speed operation does not reduce fuel consumption as effectively as fuel consumption reduction experienced at lower speeds.

As illustrated in the figure, an example vehicle 100 (e.g., a hybrid automobile) is able to collect and process performance information related to vehicle performance, especially with respect to fuel economy. From the collected and analyzed performance information, operations of the vehicle may be adjusted to improve performance (e.g., operations of its alternative fuel system such as an electric motor). To provide this capability, the vehicle includes a performance manager 102 (here embedded in the dashboard of the vehicle 100) that may be implemented in hardware (e.g., a controller 104), software (e.g., executable instructions residing on a computing device contained in the vehicle), a combination of hardware and software, etc. In some arrangements, the performance manager 102 may operate in a generally autonomous manner, however, information from one or more users (e.g., identification of the vehicle operators) may be collected for operations of the performance manager 102. To collect performance information of the vehicle, data may be collected from one or a variety of inputs. For example, the performance manager 102 may communicate with one or more portions of the vehicle. One or more sensors, components, processing units, etc. of the vehicle may exchange data with the performance manager 102. For example, operational information of the vehicle such as speed, acceleration, etc. may be collected over time (e.g., as the vehicle operates) and provided to the performance manager 102. Other operational information may also be provided from the vehicle; for example, data representing braking, steering, etc. may also be provided to the performance manager 102. Vehicle components that provide information to the performance manager 102 may also include interface modules, circuitry, etc. for controlling the operations of the combustion engine, the electrical motor, etc.

In some situations, data from sources other than the vehicle may also be collected. For example, user input may be provided. In this arrangement, the vehicle 100 includes an electronic display 106 that has been incorporated into its dashboard to present information such as selectable entries regarding different topics (e.g., operator ID, planned vehicle operations, trip destination, etc.). Upon selection, representative information may be gathered and provided to the performance manager 102. To interact with the electronic display 106, a knob 108 illustrates a potential control device; however, one or more other types of devices may be used for user interaction (e.g., a touch screen display, etc.). Similar to using one or more sensors to collect operational data, other types of information may also be gathered; for example, a sensor 110 (here embedded in the dashboard of the vehicle 100) may collect information such as cabin temperature, location of the vehicle (e.g., the sensor being a component of a global positioning system (GPS)) and other types of information. By collecting information such as GPS location, additional information may be provided to the performance manager 102 (e.g., location and destination information) which may be used for quantifying vehicle performance. In some arrangements, information from other vehicles may be used by the performance manager 102. For example, data may be collected from a fleet of vehicles (e.g., similar or dissimilar to the vehicle 100) and used to quantify performance (e.g., based on similarly traveled routes).

Multiple additional sensors may be located internally or externally to the vehicle for collecting information. For example, an electric motor 120 and associated inverter 122 installed as part of the powertrain of the vehicle 100 can have one or more sensors 124, 126 that provide information about the electric motor 120 and inverter 122. One or more devices present in the vehicle 100 may also be used for information collection; for example, handheld devices (e.g., a smart phone 112, etc.) may collect and provide information (e.g., location information, identify individuals present in the vehicle such as vehicle operators, etc.) for use by the performance manager 102 (e.g., identify driving characteristics of a vehicle operator). Similarly, portions of the vehicle itself (e.g., vehicle components) may collect information for the performance manager 102; for example, one or more of the seats of the vehicle 100 (e.g., driver seat 114) may collect information (e.g., position of the seat to estimate the driver's height) that is then being provided to the performance manager 102. Processed data may also be provided; for example, gathered information may be processed by one or more computing devices (e.g., controllers) before being provided to the performance manager 102.

In general, the collected operational information (vehicle speed, acceleration, etc.) can be used for defining vehicle operational situations. For example, the vehicle may operate over ranges of speeds, accelerations, etc., based on the operational environment. For highways, remote rural settings, etc. the vehicle may be driven at relatively high speeds for long periods of time. Alternatively, in a busy urban setting, the vehicle may be operated over a larger range of speeds (e.g., slow speeds due to congested traffic) for relatively short periods of time. Strategies may be developed for controlling the alternative fuel system of a hybrid vehicle (e.g., an electric motor) to assist the combustion engine of the vehicle to improve overall performance.

In some arrangements, along with collecting information at the vehicle, remotely located information sources may be accessed by the vehicle. Similarly, some or all of the functionality of the performance manager 102 may be provided from a remote location. While residing onboard the vehicle 100 in the illustrated figure, in some arrangements, the performance manager 102 or a portion of the performance manager may be located and executed at one or more other locations. In such situations, the vehicle 100 may be provided assistance from a remotely located performance manager by using one or more communication techniques and methodologies. For example, one or more wireless communication techniques (e.g., radio frequency, infrared, etc.) may be utilized that call upon one or more protocols and/or standards (e.g., the IEEE 802.11 family of standards such as Wi-Fi, the International Mobile Telecommunications-2000 (IMT-2000) specifications such as 3rd generation mobile telecommunications (3G), 4th generation cellular wireless standards (4G), wireless technology standards for exchanging data over relatively short distances such as Bluetooth, etc.).

Figure 2:
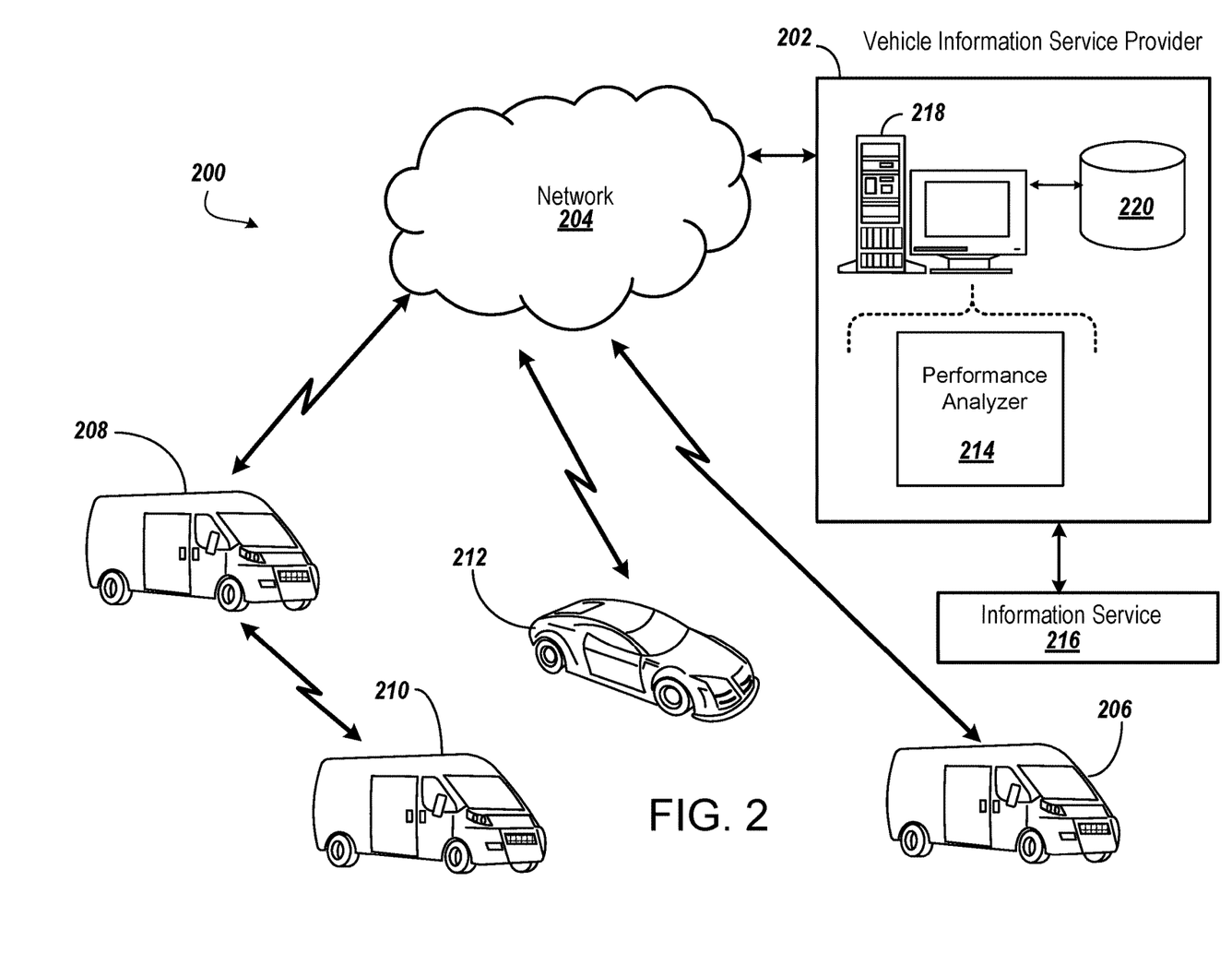
FIG. 2 illustrates a network-based vehicle analyzer for processing data for various electric vehicles.

Referring to FIG. 2, an information exchanging environment 200 is presented that allows information to be provided to a central location for analyzing vehicle performance, such as potential improvements through use of alternative fuel vehicles such as hybrid vehicles. In some arrangements, the information is collected from individual vehicles or other information sources for the performance analysis. One or more techniques and methodologies may be implemented for providing such information to the vehicles. For example, one or more communication techniques and network architectures may be used for exchanging information. In the illustrated example a vehicle information manager 202 communicates through a network 204 (e.g., the Internet, an intranet, a combination of networks, etc.) to exchange information with a collection of vehicles (e.g., a small fleet of supply trucks 206, 208, 210, and an automobile 212). For comparative analysis, one or more of the vehicles may operate with an alternative fuel system (e.g., the supply truck 206 is a hybrid).

In some arrangements, the network architecture 204 may be considered as including one or more of the vehicles. For example, vehicles may include equipment for providing one or more network nodes (e.g., supply truck 208 functions as a node for exchanging information between the supply truck 210 and the network 204). As such, the information exchanging capability may include the vehicles exchanging information with the vehicle information manager 202 and other potential network components (e.g., other vehicles, etc.).

One or more technologies may be used for exchanging information among the vehicle information manager 202, the network 204 (or networks) and the collection of vehicles. For example, wireless technology (capable of two-way communication) may be incorporated into the vehicles for exchanging information with the vehicle information manager 202. Along with providing and collecting information from the vehicles, the vehicle information manger 202 may be capable of processing information (e.g., in concert with a performance analyzer 214 to quantify vehicle performance, compare vehicle performance, etc.) and executing related operations (e.g., store collected and processed information). In some arrangements, the vehicle information manager 202 may operate as a single entity; however, operations may be distributed among various entities to provide the functionality. In some arrangements, some functionality (e.g., operations of the performance analyzer 214) may be considered a service, rather than a product, and may be attained by entering into a relationship with the vehicle information manager 202 (e.g., purchase a subscription, enter into a contractual agreement, etc.). As such, the vehicle information manager 202 may be considered as being implemented as a cloud computing architecture in which its functionality is perceived by users (e.g., vehicle operators, business operators, vehicle designers and manufacturers, etc.) as a service rather than a product. For such arrangements, users may be provided information (e.g., vehicle performance, comparative performances, control strategies, etc.) from one or more shared resources (e.g., hardware, software, etc.) used by the vehicle information manager 202. For service compensation, one or more techniques may be utilized; for example, subscription plans for various time periods may be implemented (e.g., a time period for measuring the performance of a current fleet of vehicles along with candidate hybrid vehicles to demonstrate potential performance gains).

Similar to an onboard assistance manager (e.g., the performance manager 102 of FIG. 1), an off-vehicle performance analyzer (e.g., the performance analyzer 214) may use information from a vehicle (e.g., collected performance data, distributions of data, etc.) to determine one or more performance metrics of the vehicle, comparison metrics, etc.

Along with information being provided by one or more vehicles (e.g., received onboard, received through the network 204, etc.), the vehicle information manager 202 may utilize data from other sources for performance analysis, etc. For example, information sources 216 external to the vehicle information manager 202 may provide vehicle related information (e.g., manufacturer recommendations for performance, vehicle load conditions, etc.), environmental information (e.g., current road conditions where the vehicle is operating, traffic conditions, topographical information, weather conditions and forecasts, etc.). In some arrangements, the information sources 216 may be in direct communication with the vehicle information manager 202; however, other communication techniques may also be implemented (e.g., information from the information sources 216 may be provided through one or more networks such as network 204).

In the illustrated example, to provide such functionality, the vehicle information manager 202 includes a server 218 that is capable of being provided information by the network 204 and the information sources 216. Additionally, the server 218 is illustrated as being in direct communication with a storage device 220 that is located at the vehicle information manager 202 (however, remotely located storage may be accessed by the server 218). In this example the functionality of the performance analyzer 214 is located off-board a vehicle while the functionality of the performance manager 102 (shown in FIG. 1) is located on-board the vehicle. In some examples, some functionality of the performance analyzer 214 and the performance manager 102 may be executed at other locations, distributed across multiple locations, etc. In one arrangement, a portion of the functionality of the performance analyzer 214 may be executed on-board a vehicle or a portion of the performance manager 102 may executed at the vehicle information manager 202. Information provided by one or more of the sources (e.g., the vehicles, information sources 216, etc.), performance metrics and comparisons may be developed by the performance analyzer 214. For example, one or more metrics may be determined that provides a measure of fuel economy of each vehicle, metrics that represent comparison between vehicles (e.g., fuel saving of a hybrid vehicle compared to a combustion engine vehicle). Along with determining such metrics and comparisons, functionality of the performance analyzer 214 may appropriately manage collected data, distributions, determined performance and comparison metrics, etc. for delivery (e.g., to service subscribers, entities, vehicles, etc.). For example, one or more database systems, data management architectures and communication schemes may be utilized by the performance analyzer 214 for information distribution. In some arrangements, such distribution functionality may be provided partially or fully by the performance analyzer 214 or external to the performance analyzer. In some arrangements, this distributed functionality may be provided by other portions of the vehicle information manager 202 or provided by another entity separate from the vehicle information manager 202 for distributing metrics and/or other types of performance and/or comparison based information. Further, while a single server (e.g., server 218) is implemented in this arrangement to provide the functionality for the vehicle information manager 202, additional servers or other types of computing devices may be used to provide the functionality. For example, operations of the performance analyzer 214 may be distributed among multiple computing devices in one or more locations.

Upon one or more metrics (e.g., performance, comparison, etc.) being produced, one or more operations may be executed to provide appropriate information, for example, to one or more entities, vehicles, etc. By employing one or more data transition techniques information may be delivered through the network 204 along with other types of communication systems. In some arrangements, one or more trigger events may initiate the information being sent. For example, upon one or more messages, signals, etc. being received at the vehicle information manager 202 (e.g., a request for particular performance information is received), data representing the requested performance information may be provided.

Figure 3:
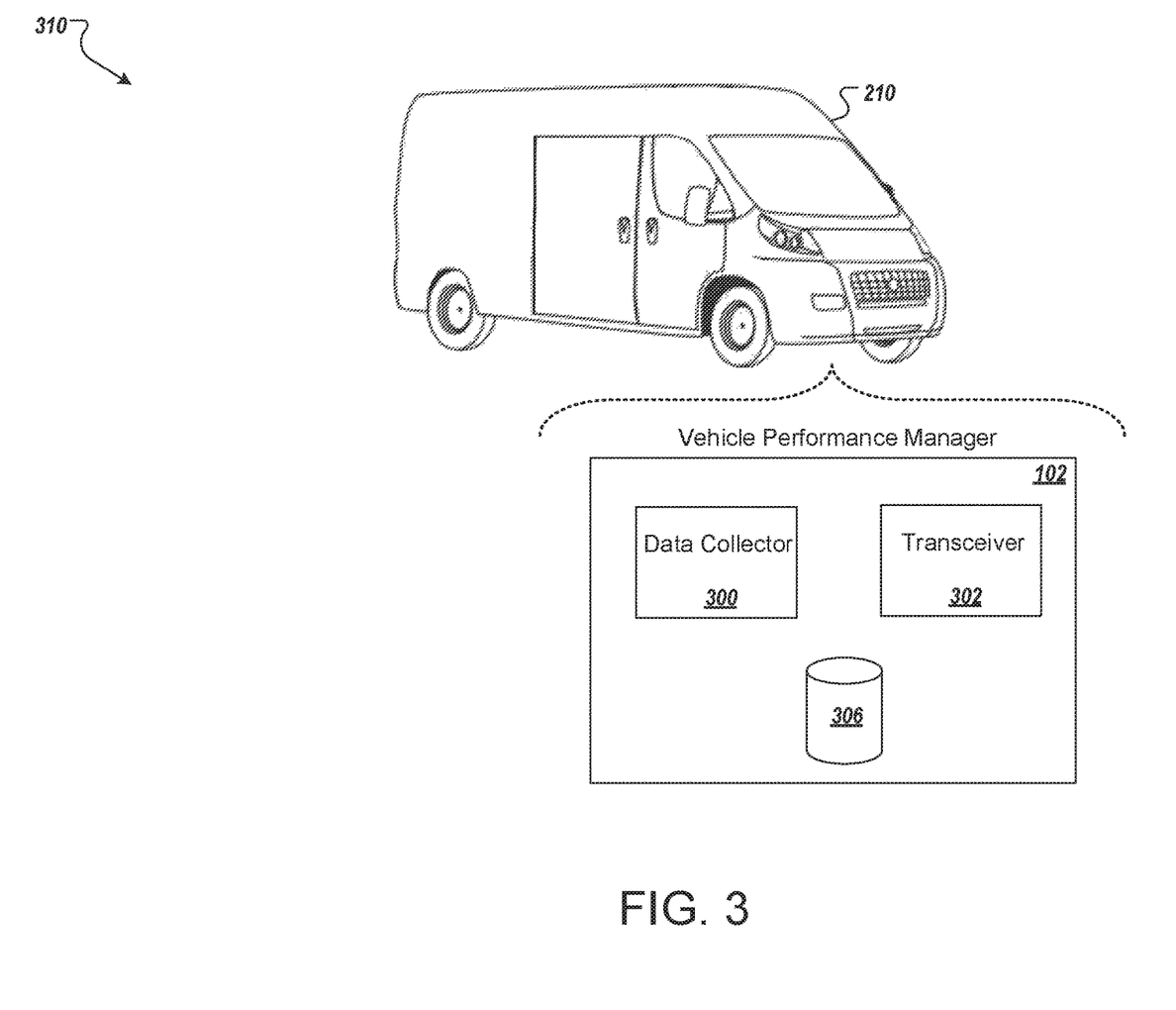
FIG. 3 illustrates portions of a vehicle performance manager included in a vehicle for controlling the transmission of information associated with a vehicle.

Referring to FIG. 3, one of the vehicles presented in FIG. 2 (i.e., truck 210) illustrates potential components included in the vehicle performance manager 102, which may be implemented in hardware, software, a combination of hardware and software, etc. One included component for this arrangement 310 is a data collector 300 that is capable of interfacing various components of the vehicle to collect vehicle-related information such as operational parameters, e.g., from sensors 110, 124, 126. Additionally, the vehicle data collector 300 may be capable of collecting information from other sources external to the vehicle. Also included is a transceiver 302 that is capable of transmitting information from the vehicle to one or more locations (e.g., the vehicle information manager 202). While the transceiver 302 is also capable of receiving information (e.g., from the vehicle information manager 202), in some arrangements such a capability may be absent (thereby only allowing for transmission of information).

The vehicle performance manager 102 may implement one or more techniques to improve the efficiency of truck 210, for example, monitoring speed, acceleration, deceleration, fuel consumption, etc. This monitoring can be done by sensors, which are part of data collector 300, for example, sensor 124 that can be configured to detect the displacement of the motor's rotor relative to its stationary inverter. To assist the operations of the vehicle performance manager 102, the transceiver 302, and the data collector 300, one or more data storage techniques may be employed. As illustrated, one or more storage devices (e.g., memory components, hard drives, etc.) such as storage device 306 may be included in the performance manager 102. The storage device 306 could also be a one or more types of software structures. In addition to assisting with the operations of the vehicle performance manager components, the storage device 306 may also be considered as providing a data store for information such as operational parameters (collected during the operation of the vehicle or initial set up of the electric motor and inverter within the vehicle) that can be later accessed. For example, after traveling its route, collected data may retrieved from the storage device 306 (e.g., by the vehicle owner, the vehicle information manager 202, etc.) for analysis to quantify performance, to compare performance with other vehicles, etc.

The vehicle performance manager 102 can implement a motor offset calibration in truck 210 that has a permanent magnet motor as the electric motor 120. A permanent magnet rotor of typical construction includes a rotor that revolves relative to a stator that has stator windings and an embedded permanent magnet. One theory of permanent magnet motors describes the motor as having a direct axis (or d axis) and quadrature axis (or q axis), resolving the motor's magnetomotive force into two mutually orthogonal single-phase components for a three-phase motor. One component is located along the axis of the rotor permanent magnetic poles (the axis by which flux is produced by the winding of the motor). This component is known as the direct axis or d axis component. The other component is located orthogonal to this axis and is the axis on which torque is produced, known as the quadrature axis or q axis component.

Normally, voltage on the d axis (Vd) is zero when a permanent magnet rotor is spun unloaded (i.e., with no current through the windings). The voltage that appears is a result of the rotor's magnetic field (the backemf voltage) from the magnets moving relative to the stator coils and appears entirely on the q axis (Vq). Backemf acts against the applied voltage that is causing the motor to spin. Backemf is zero when the motor is not turning, and increases proportionally to the motor's angular velocity.

Referring briefly back to FIG. 1, this theory of a d axis and q axis can be applied to the electric motor 120 with a sensor 124 that is a position sensor that detects the position of the rotor of the motor (also called a resolver) and a sensor 126 that detects voltage. The electric motor 120 in truck 210 can be rotated without power applied to it, which should result in a Vd of zero. Any non-zero voltage indicates there is error in position of the sensor 124. The vehicle performance manager 102 therefore measures motor speed (rpm) using the sensor 124 and also measures Vd using a voltage sensor 126. The rotor shaft of the electric motor 120 will turn although no current is applied to it when the combustion engine causes the car and the wheels to move, turning the shaft of the electric motor. The measured ratio of Vd/rpm of the electric motor is minimized to minimize position error.

When there is a static angle error in the position of sensor 124, a proportion of the backemf that should only be appearing on the q axis as Vq will instead appear on Vd according to:

$$Vd = \text{electrical-frequency} * \text{PM\_Flux\_Linkage} * \sin(\text{angle\_error}). \quad (1)$$

Here Vd is the measured d axis voltage, electrical-frequency is the electrical frequency, PM_Flux_Linkage is the flux linkage of the permanent magnet, and angle error is the error in angle of the motor that is being determined.

The rotational speed of the permanent magnet electric motor is also proportional to electrical frequency according to:

$$RPM = (\text{electrical\_frequency}/\text{pole-pairs}) * (30/pi). \quad (2)$$

Where RPM is the rotational frequency of the motor's rotor, and pole-pairs are a constant of the motor.

Knowing the motor speed and d axis voltage allows their ratio to be calculated as:

$$Vd/\text{rpm} = \text{pole-pairs} * \text{PM\_Flux\_Linkage} * (pi/30) * \sin(\text{angle error}) \quad (3)$$

If the angle error is zero, then Vd should be zero as well. Positive error results in positive Vd and negative error results in negative Vd, either of which means that the sensor 124 has a position offset that must be corrected. That error can be determined by rearranging equation (3) and averaging Vd and RPM values to reduce error as:

$$\text{Error} = \sin^{-1}((\text{avg}(Vd/\text{RPM}))/(\text{pole-pairs}*(pi/30)*\text{PM\_Flux\_Linkage})). \quad (4)$$

Thus, a correction for the offset angle of the electric motor 120 can be determined. These offset angles are typically close to zero degrees. Adding the correction offset effectively re-centers the measurements around zero degrees once again.

The above calculations assume that the motor is installed in the correct orientation (i.e. a clockwise rotation of the shaft for positive vehicle speed when seen from the front of the vehicle) with respect to the rest of the system. However, when the electric motor 120 is installed in a vehicle as part of the process of converting it into an HEV such as the truck 210, the motor offset may be greater than a few degrees. That is, the motor may be installed in the reverse manner from what was intended; the connections between the installed motor 120 and inverter 122 can be made incorrectly. The orientation of the motor is dictated by the vehicle geometry where some vehicle platform geometries may warrant the installation of the motor in a reverse direction. If such a hardware error occurs, when the vehicle is moving forward with a positive speed the motor would register as experiencing a negative rather than positive rotation direction. That is, positive torque may be applied to the shaft on which the motor is mounted, but as the shaft rotates in the reverse direction it subsequently registers incorrect angles and incorrect spin. If this error is not detected and corrected, the system may incorrectly determine a requirement for charging instead of discharging of the energy storage device, or vice versa. Using the methods described, the system determines that the detected motor angle is incorrect, calculates the correction, and stores the correction in the memory of the inverter 122 for a particular motor 120.

During installation, the person performing the installation should map the voltage terminals of the motor 120 and the inverter 122 according to specification. For example, terminals A, B, C should be matched to terminals 1, 2, 3 in a predetermined fashion such as A-1, B-2, C-3. If the motor is installed backwards, for example, the mapping would need to change to account for installation direction of the motor. For example, if the terminals are mapped as A-1, B-3, C-2, the motor will register as having an orientation offset of 120°. In some instances, the motor will have an orientation of −120°. This orientation offset causes the motor angle to shift from its proper default value of zero (or close to zero if calibrated correctly), to around 120° (or around −120°).

For example, a motor 120 may have an actual offset error of 10°, which can be determined using the equations above. However, the incorrect motor orientation will cause the offset effectively to be 130° instead of 10°. Any attempted correction calculation will be very inaccurate, or will fail.

Equipment constraints can cause additional error in any correction calculations caused by the orientation offset of 120°. Currently, some of the inverters 122 can only store values up to 127 due to their construction. Any installed motor 120 with an actual static offset angle of more than seven thus will certainly produce an incorrect calibration, since adding 120° to the actual static offset angle would cause the value to exceed the bounds of the inverter 122. In the example of a motor with a 10° actual static offset angle, the further motor orientation offset of 120° will be read as 127° since the resulting 130° will be beyond of maximum value that can be stored. The motor will fail to calibrate correctly.

To compensate for this additional error due to motor orientation, the system is configured to detect the motor angle and determine if the value indicates that the motor is installed with an incorrect orientation (e.g., an angle that is far from zero, and/or near) 120°. If found, the system compensates accordingly by subtracting 120 from the angle measurement (or adding 120). The resolved angle is then properly centered on zero.

With such a method in place, an HEV installer need not be concerned with correction voltage sequence. Instead, once installed, the controller enters a routine requiring that the vehicle be driven at a certain (low) speed range. The value of the error found is then used for all upcoming trips (unless a change is made to the motor or other systems).

Figure 4:
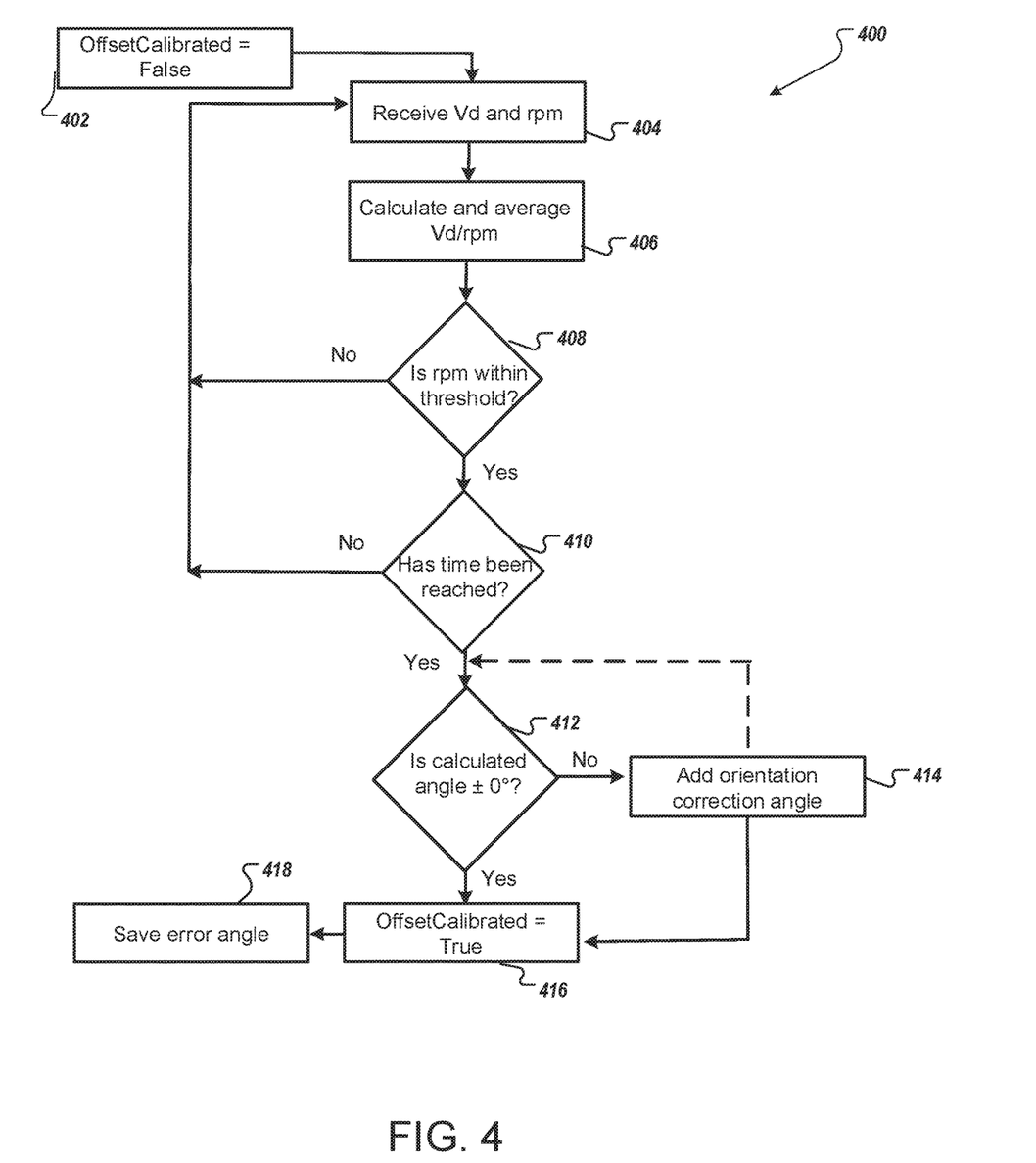
FIG. 4 illustrates a flowchart of operations of a vehicle performance manager capable of determining orientation of an electric motor installed in a vehicle.

Referring to FIG. 4, a flow chart 400 of the performance manager 102 is presented that represents one arrangement for calculating the correction for the offset angle for of the electric motor 120. As provided in the figure, operations initiate with a Boolean variable representing whether the offset has been calibrated (e.g., OffsetCalibrated) being set at a default False value, step 402. Whenever this value is False, the vehicle performance manager 102 sends zero current to (e.g., requests zero torque from) the electric motor 120, so that the error can be calibrated.

Next, and while the vehicle is under operation with torque supplied from the combustion engine but still no current applied to the electric motor 120, vehicle data including rpm of the electric motor 120 and the voltage Vd are received by the performance manager 102, step 404. These parameters may be received by the performance manager 102 from one or more sensors, subsystems, etc. on-board the vehicle. In particular, sensor 124 on the electric motor can be a sensor that measures rpm and position of the rotating motor shaft relative to the stator or stationary part of the motor. Upon receiving the vehicle data, the vehicle performance manager 102 calculates a ratio of the parameters, step 406. For example, a ratio Vd/rpm is calculated. This value can be calculated after a single rotation or averaged over multiple (e.g., two or more) rotations. The number of rotations can vary in specific implementations. For example, a first vehicle or vehicle type performs step 406 after two rotations, while a second vehicle or vehicle type performs step 406 after 10 rotations. Step 406 can be carried out under different conditions (different number of rotations, different speed of vehicle, etc.).

The rpm of the electric motor is directly related to the speed of vehicle since the drive shaft is connected to the vehicle tires, which are in contact with the road. At step 408 the vehicle performance manager 102 determines if the rpm (or averaged rpm) is within a desired threshold, as the vehicle must be going fast enough to get measurable voltage. For example, the lower threshold might be 300 rpm. The upper threshold is significantly higher, e.g., 800 rpm. Both lower and upper thresholds can be different for each vehicle type and application. As the upper threshold is so high, effectively step 408 is reached once the lower threshold is crossed. These conditions can be met in as little as 20 ft. of vehicle travel at less than 10 mph. If the rpm value is outside the threshold, the process returns to step 404 to continue receiving Vd and rpm. If the threshold is met, at step 410 the system checks if a pre-determined averaging time (e.g., 1 second, 10 seconds) has been met. If not, the method returns to step 404 to continue receiving Vd and rpm. If the averaging time has elapsed, at step 412 the system calculates the angle error according to the equations above.

The performance manager 102 monitors the calculated angle error and determines whether the calculated angle is near a reading indicating that the motor is correctly oriented (e.g., close to zero degrees, ±15°), step 412. If the angle is within a range of angles near 0°, then the controller sets and saves the OffsetCalibrated Boolean variable as True, step 416. If it is not within the range of values near 0°, the system subtracts 120° from the value if the angle is positive, and adds 120° to the value is negative, and proceeds to step 416. In some instances, the system can return to step 412 and confirm that the correction factor returns a calculated angle near 0.

Once step 416 has been completed, the system saves the calculated error angle, step 418, for use with further calculations and performance management of the system, e.g., by subtracting the calculated error angle from the previous offset angle adjustment. Once the OffsetCalibrated variable is set to True the system operates normally and can request non-zero torque from the motor.

The non-volatile OffsetCalibrated variable can be reset to False anytime to re-calibrate the motor. For example, these steps can be carried out at motor setup, or if the motor is adjusted (e.g., serviced) or altered. In some instances, these steps can be performed if error reports from vehicle are being received. For example, the off-vehicle performance analyzer 214 may use information from the vehicle (e.g., collected performance data) to determine if one or more performance metrics of the vehicle, comparison metrics, etc., are not within desired operating conditions. In such a case, a trigger signal can initiate a diagnostic procedure that includes performing the steps of flow chart 400 to determine if the previously calculated angle offset is wrong. A remote command can be sent to the truck 210 to reset the offset, effectively manually re-running the calibration.

Figure 5:
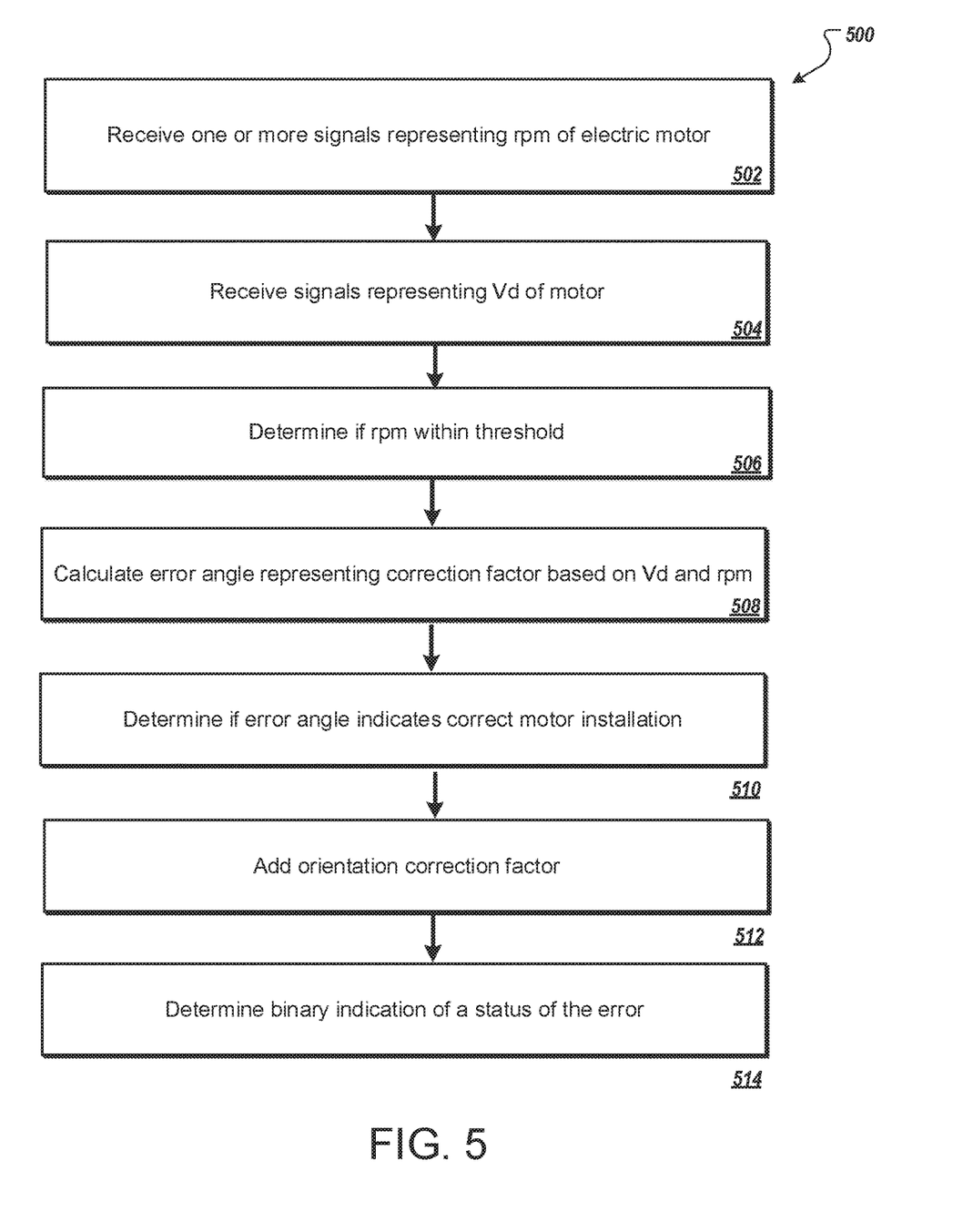
FIG. 5 illustrates a flowchart representative of operations of a vehicle performance manager.

Referring to FIG. 5, a flowchart 500 represents operations including those of a computing device, such as a controller (e.g., the controller 104 shown in FIG. 1) executing the functions of a vehicle performance manager 102 (also shown in FIG. 1). Operations begin with the vehicle moving forward with the combustion engine engaged and no current provided to the electric motor. For example, the combustion engine can move the vehicle forward at a low speed, such as less than 20 mph for a short distance, such as 20 ft. At step 502, one or more signals representing the angular speed (rpm) of the motor are received. Step 504 includes receiving data representative of the Vd of the motor. The rpm received is compared to a threshold at step 506. Operations may also include calculating 508 a motor offset based on the one or more received rpm and Vd of the vehicle. Operations may also include determining if a motor orientation adjustment factor is required if the offset indicates that the orientation of the motor is incorrect, step 510. If such an adjustment is needed, the orientation correction factor is added to the correction offset, or if the orientation is correct, the adjustment may include adding zero to the offset, step 512

Once an offset is calculated, operations may further include saving data representing the calculated offset and saving a Boolean or binary indication representing the calibrated status of the motor as being true, step 514. This can be transmitted to a vehicle information service provider located internal and/or external from the vehicle. Other parameters transmitted may represent information such as vehicle speed, component temperature, brake pedal position, acceleration, fuel consumption, etc. and may be received from one or more sensors located onboard a vehicle or from other information sources.

Figure 6:
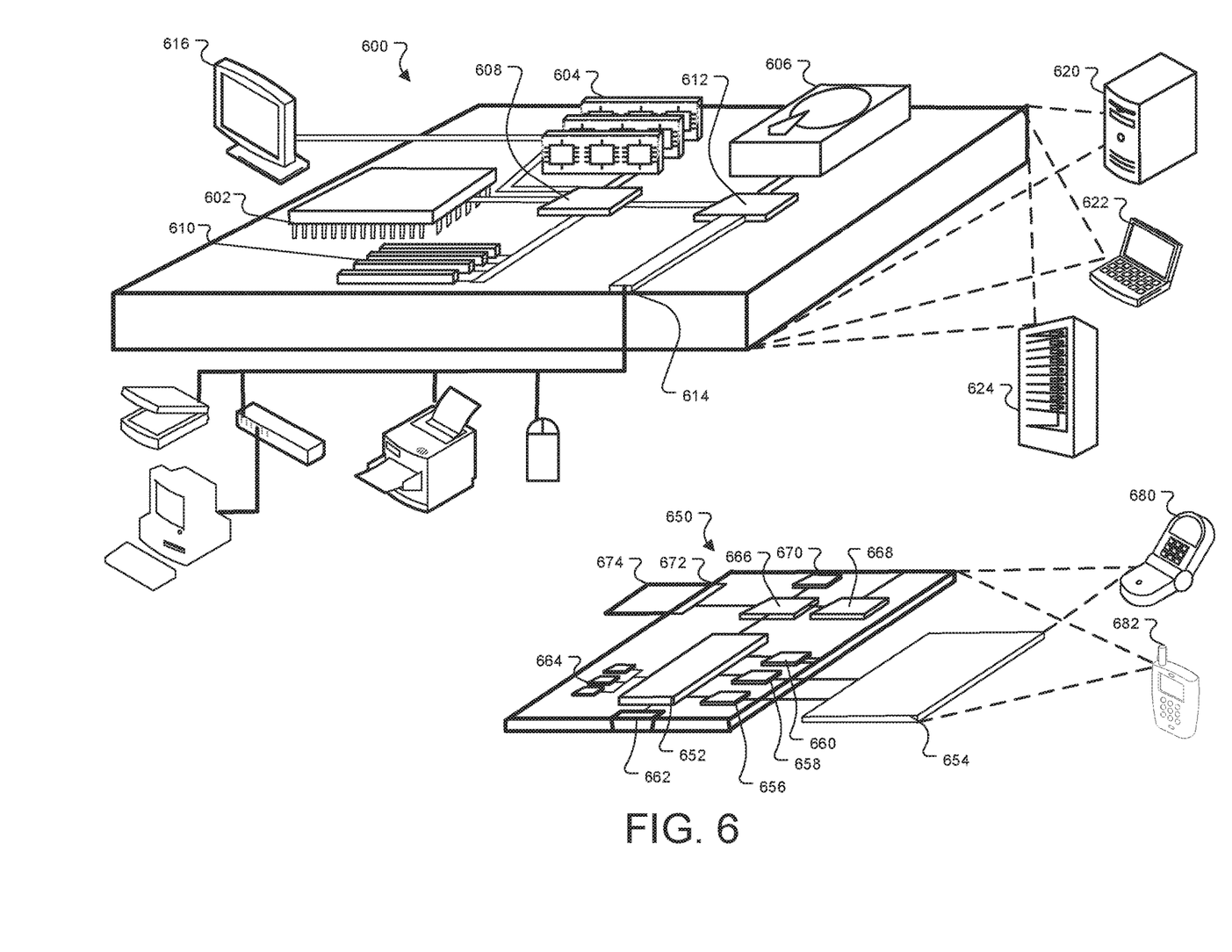
FIG. 6 illustrates an example of a computing device and a mobile computing device that can be used to implement the techniques described here.

FIG. 6 shows an example computer device 600 and example mobile computer device 650, which can be used to implement the techniques described herein. For example, a portion or all of the operations of an information manager (e.g., the vehicle performance manger 102 shown in FIG. 1) and/or a vehicle analyzer (e.g., the performance analyzer 214 shown in FIG. 2) may be executed by the computer device 600 and/or the mobile computer device 650. Computing device 600 is intended to represent various forms of digital computers, including, e.g., laptops, desktops, workstations, personal digital assistants, servers, blade servers, mainframes, and other appropriate computers. Computing device 650 is intended to represent various forms of mobile devices, including, e.g., personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 600 includes processor 602, memory 604, storage device 606, high-speed interface 608 connecting to memory 604 and high-speed expansion ports 610, and low speed interface 612 connecting to low speed bus 614 and storage device 606. Each of components 602, 604, 606, 608, 610, and 612, are interconnected using various busses, and can be mounted on a common motherboard or in other manners as appropriate. Processor 602 can process instructions for execution within computing device 600, including instructions stored in memory 604 or on storage device 606, to display graphical data for a GUI on an external input/output device, including, e.g., display 616 coupled to high speed interface 608. In other implementations, multiple processors and/or multiple buses can be used, as appropriate, along with multiple memories and types of memory. Also, multiple computing devices 600 can be connected, with each device providing portions of the necessary operations (e.g., as a server bank, a group of blade servers, or a multi-processor system).

Memory 604 stores data within computing device 600. In one implementation, memory 604 is a volatile memory unit or units. In another implementation, memory 604 is a non-volatile memory unit or units. Memory 604 also can be another form of computer-readable medium, including, e.g., a magnetic or optical disk.

Storage device 606 is capable of providing mass storage for computing device 600. In one implementation, storage device 606 can be or contain a computer-readable medium, including, e.g., a floppy disk device, a hard disk device, an optical disk device, a tape device, a flash memory or other similar solid state memory device, or an array of devices, including devices in a storage area network or other configurations. A computer program product can be tangibly embodied in a data carrier. The computer program product also can contain instructions that, when executed, perform one or more methods, including, e.g., those described above. The data carrier is a computer- or machine-readable medium, including, e.g., memory 604, storage device 606, memory on processor 602, and the like.

High-speed controller 608 manages bandwidth-intensive operations for computing device 600, while low speed controller 612 manages lower bandwidth-intensive operations. Such allocation of functions is an example only. In one implementation, high-speed controller 608 is coupled to memory 604, display 616 (e.g., through a graphics processor or accelerator), and to high-speed expansion ports 610, which can accept various expansion cards (not shown). In the implementation, the low-speed controller 612 is coupled to storage device 606 and low-speed expansion port 614. The low-speed expansion port, which can include various communication ports (e.g., USB, Bluetooth®, Ethernet, wireless Ethernet), can be coupled to one or more input/output devices, including, e.g., a keyboard, a pointing device, a scanner, or a networking device including, e.g., a switch or router (e.g., through a network adapter).

Computing device 600 can be implemented in a number of different forms, as shown in the figure. For example, it can be implemented as standard server 620, or multiple times in a group of such servers. It also can be implemented as part of rack server system 624. In addition or as an alternative, it can be implemented in a personal computer (e.g., laptop computer 622). In some examples, components from computing device 600 can be combined with other components in a mobile device (not shown) (e.g., device 650). Each of such devices can contain one or more of computing device 600, 650, and an entire system can be made up of multiple computing devices 600, 650 communicating with each other.

Computing device 650 includes processor 652, memory 664, and an input/output device including, e.g., display 654, communication interface 666, and transceiver 668, among other components. Device 650 also can be provided with a storage device, including, e.g., a microdrive or other device, to provide additional storage. Components 650, 652, 664, 654, 666, and 668, may each be interconnected using various buses, and several of the components can be mounted on a common motherboard or in other manners as appropriate.

Processor 652 can execute instructions within computing device 650, including instructions stored in memory 664. The processor can be implemented as a chipset of chips that include separate and multiple analog and digital processors. The processor can provide, for example, for the coordination of the other components of device 650, including, e.g., control of user interfaces, applications run by device 650, and wireless communication by device 650.

Processor 652 can communicate with a user through control interface 658 and display interface 656 coupled to display 654. Display 654 can be, for example, a TFT LCD (Thin-Film-Transistor Liquid Crystal Display) or an OLED (Organic Light Emitting Diode) display, or other appropriate display technology. Display interface 656 can comprise appropriate circuitry for driving display 654 to present graphical and other data to a user. Control interface 658 can receive commands from a user and convert them for submission to processor 652. In addition, external interface 662 can communicate with processor 642, so as to enable near area communication of device 650 with other devices. External interface 662 can provide, for example, for wired communication in some implementations, or for wireless communication in other implementations. Multiple interfaces also can be used.

Memory 664 stores data within computing device 650. Memory 664 can be implemented as one or more of a computer-readable medium or media, a volatile memory unit or units, or a non-volatile memory unit or units. Expansion memory 674 also can be provided and connected to device 850 through expansion interface 672, which can include, for example, a SIMM (Single In Line Memory Module) card interface. Such expansion memory 674 can provide extra storage space for device 650, and/or may store applications or other data for device 650. Specifically, expansion memory 674 can also include instructions to carry out or supplement the processes described above and can include secure data. Thus, for example, expansion memory 674 can be provided as a security module for device 650 and can be programmed with instructions that permit secure use of device 650. In addition, secure applications can be provided through the SIMM cards, along with additional data, including, e.g., placing identifying data on the SIMM card in a non-hackable manner.

The memory can include, for example, flash memory and/or NVRAM memory, as discussed below. In one implementation, a computer program product is tangibly embodied in a data carrier. The computer program product contains instructions that, when executed, perform one or more methods, including, e.g., those described above.

The data carrier is a computer- or machine-readable medium, including, e.g., memory 664, expansion memory 674, and/or memory on processor 652, which can be received, for example, over transceiver 668 or external interface 662.

Device 650 can communicate wirelessly through communication interface 666, which can include digital signal processing circuitry where necessary. Communication interface 666 can provide for communications under various modes or protocols, including, e.g., GSM voice calls, SMS, EMS, or MMS messaging, CDMA, TDMA, PDC, WCDMA, CDMA2000, or GPRS, among others. Such communication can occur, for example, through radio-frequency transceiver 668. In addition, short-range communication can occur, including, e.g., using a Bluetooth®, WiFi, or other such transceiver (not shown). In addition, GPS (Global Positioning System) receiver module 670 can provide additional navigation- and location-related wireless data to device 650, which can be used as appropriate by applications running on device 650.

Device 650 also can communicate audibly using audio codec 660, which can receive spoken data from a user and convert it to usable digital data. Audio codec 660 can likewise generate audible sound for a user, including, e.g., through a speaker, e.g., in a handset of device 650. Such sound can include sound from voice telephone calls, recorded sound (e.g., voice messages, music files, and the like) and also sound generated by applications operating on device 650.

Computing device 650 can be implemented in a number of different forms, as shown in the figure. For example, it can be implemented as cellular telephone 680. It also can be implemented as part of smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system. This includes at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for presenting data to the user, and a keyboard and a pointing device (e.g., a mouse or a trackball) by which the user can provide input to the computer. Other kinds of devices can be used to provide for interaction with a user as well. For example, feedback provided to the user can be a form of sensory feedback (e.g., visual feedback, auditory feedback, or tactile feedback). Input from the user can be received in a form, including acoustic, speech, or tactile input.

The systems and techniques described here can be implemented in a computing system that includes a backend component (e.g., as a data server), or that includes a middleware component (e.g., an application server), or that includes a frontend component (e.g., a client computer having a user interface or a Web browser through which a user can interact with an implementation of the systems and techniques described here), or a combination of such backend, middleware, or frontend components. The components of the system can be interconnected by a form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engines described herein can be separated, combined or incorporated into a single or combined engine. The engines depicted in the figures are not intended to limit the systems described here to the software architectures shown in the figures.

A number of embodiments have been described. Nevertheless, it will be understood that various modifications can be made without departing from the spirit and scope of the processes and techniques described herein. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A computing device implemented method comprising:
    receiving, by a processor, one or more signals that represent an angular speed of a permanent magnet electric motor of a hybrid electric vehicle, the one or more signals being provided by an angular sensor connected to the permanent magnet electric motor;
    receiving, by the processor, a signal representing a voltage from the permanent magnet electric motor, the voltage being a direct axis voltage component of a three-phase motor model;
    calculating, by the processor, an error angle representing a correction factor for an alignment of the permanent magnet electric motor based on a ratio of the voltage and the angular speed when the angular speed broaches a predetermined threshold; and
    adding, by the processor, an orientation correction factor to the error angle when the error angle is indicative of the permanent magnet electric motor being installed in an incorrect orientation.

2. The method of claim 1, wherein adding the orientation correction factor to the error angle when the error angle is indicative of the permanent magnet electric motor being installed in the incorrect orientation comprises determining that the error angle is indicative of the permanent magnet electric motor being installed in the incorrect orientation when the error angle is within a predefined range.

3. The method of claim 2, wherein the predefined range is ±15°.

4. The method of claim 1, wherein the orientation correction factor is ±120°.

5. The method of claim 1, wherein the one or more signals are received with zero current supplied to the permanent magnet electric motor and a motion of the hybrid electric vehicle is supplied by an internal combustion engine.

6. The method of claim 1, wherein the error angle representing the correction factor is calculated using an averaged ratio of the voltage and the angular speed over more than one rotation of the permanent magnet electric motor.

7. The method of claim 1, wherein receiving the one or more signals that represent the angular speed of the permanent magnet electric motor is implemented by receiving a trigger signal sent to a performance manager of the hybrid electric vehicle when a performance parameter of the hybrid electric vehicle is determined to be outside of an acceptable operation.

8. One or more non-transitory computer readable storage devices storing instructions that are executable by a processing device, and upon such execution cause the processing device to perform operations comprising:
    receiving one or more signals that represent an angular speed of a permanent magnet electric motor of a hybrid electric vehicle, the one or more signals being provided by an angular sensor connected to the permanent magnet electric motor;
    receiving a signal representing a voltage from the permanent magnet electric motor, the voltage being a direct axis voltage component of a three-phase motor model;
    calculating an error angle representing a correction factor for an alignment of the permanent magnet electric motor based on a ratio of the voltage and the angular speed when the angular speed broaches a predetermined threshold; and
    adding an orientation correction factor to the error angle when the error angle is indicative of the permanent magnet electric motor being installed in an incorrect orientation.

9. The non-transitory computer readable storage devices of claim 8, wherein adding the orientation correction factor to the error angle when the error angle is indicative of the permanent magnet electric motor being installed in the incorrect orientation comprises determining that the error angle is indicative of the permanent magnet electric motor being installed in the incorrect orientation when the error angle is within a predefined range.

10. The non-transitory computer readable storage devices of claim 9, wherein the predefined range is ±15°.

11. The non-transitory computer readable storage devices of claim 8, wherein the orientation correction factor is ±120°.

12. The non-transitory computer readable storage devices of claim 8, wherein the one or more signals are received with zero current supplied to the permanent magnet electric motor and a motion of the hybrid electric vehicle is supplied by an internal combustion engine.

13. The non-transitory computer readable storage devices of claim 8, wherein the error angle representing the correction factor is calculated using an averaged ratio of the voltage and the angular speed over more than one rotation of the permanent magnet electric motor.

14. The non-transitory computer readable storage devices of claim 8, wherein receiving the one or more signals that represent the angular speed of the permanent magnet electric motor is implemented by receiving a trigger signal sent to a performance manager of the hybrid electric vehicle when a performance parameter of the hybrid electric vehicle is determined to be outside of an acceptable operation.

15. A system comprising:
a computing device comprising:
a memory configured to store instructions; and
a processor to execute the instructions to perform instructions comprising:
receiving one or more signals that represent an angular speed of a permanent magnet electric motor of a hybrid electric vehicle, the one or more signals being provided by an angular sensor connected to the permanent magnet electric motor;
receiving a signal representing a voltage from the permanent magnet electric motor, the voltage being a direct axis voltage component of a three-phase motor model;
calculating an error angle representing a correction factor for an alignment of the permanent magnet electric motor based on a ratio of the voltage and the angular speed when the angular speed broaches a predetermined threshold; and
adding an orientation correction factor to the error angle when the error angle is indicative of the permanent magnet electric motor being installed in an incorrect orientation.

16. The system of claim 15, wherein adding the orientation correction factor to the error angle when the error angle is indicative of the permanent magnet electric motor being installed in the incorrect orientation comprises determining that the error angle is indicative of the permanent magnet electric motor being installed in the incorrect orientation when the error angle is within a predefined range.

17. The system of claim 16, wherein the predefined range is ±15°.

18. The system of claim 15, wherein the orientation correction factor is ±120°.

19. The system of claim 15, wherein the one or more signals are received with zero current supplied to the permanent magnet electric motor and a motion of the hybrid electric vehicle is supplied by an internal combustion engine.

20. The system of claim 15, wherein the error angle representing the correction factor is calculated using an averaged ratio of the voltage and the angular speed over more than one rotation of the permanent magnet electric motor.

21. The system of claim 15, wherein receiving the one or more signals that represent the angular speed of the permanent magnet electric motor is implemented by receiving a trigger signal sent to a performance manager of the hybrid electric vehicle when a performance parameter of the hybrid electric vehicle is determined to be outside of an acceptable operation.

* * * * *